(12) United States Patent
Wack

(10) Patent No.: US 6,229,445 B1
(45) Date of Patent: May 8, 2001

(54) RF IDENTIFICATION PROCESS AND APPARATUS

(75) Inventor: C. Jay Wack, Clarksburg, MD (US)

(73) Assignee: TecSec, Incorporated, Vienna, VA (US)

( * ) Notice: Subject to any disclaimer, the term of this patent is extended or adjusted under 35 U.S.C. 154(b) by 0 days.

(21) Appl. No.: 09/006,160

(22) Filed: Jan. 13, 1998

Related U.S. Application Data

(60) Provisional application No. 60/035,477, filed on Jan. 13, 1997.

(51) Int. Cl.$^7$ ..................................................... G08B 13/14
(52) U.S. Cl. ................................. 340/572.7; 240/572.1; 240/572.6; 235/384; 235/385; 235/375
(58) Field of Search ........................ 340/572, 825.3, 340/825.54, 551, 572.1, 572.7, 572.6; 235/384, 385, 375

(56) References Cited

U.S. PATENT DOCUMENTS

| | | | |
|---|---|---|---|
| 4,647,917 | 3/1987 | Anderson, III et al. | 340/572.4 |
| 4,857,891 | 8/1989 | Heltemes | 340/551 |
| 5,288,980 | * 2/1994 | Patel et al. | 340/572 |
| 5,317,309 | * 3/1994 | Vercellotti et al. | 340/10.5 |
| 5,338,373 | * 8/1994 | VonHoene et al. | 340/572 |
| 5,414,412 | * 5/1995 | Lian | 340/572 |
| 5,563,583 | * 10/1996 | Brady et al. | 340/572.2 |
| 5,587,703 | * 12/1996 | Dumont | 340/572 |
| 5,604,485 | * 2/1997 | Lauro et al. | 340/572 |
| 5,650,768 | 7/1997 | Eswaran | 340/572.1 |
| 5,661,457 | 8/1997 | Ghaffari et al. | 340/572.7 |
| 5,682,142 | * 10/1997 | Loosmore et al. | 340/572 |
| 5,689,239 | 11/1997 | Turner et al. | 340/10.3 |
| 5,717,382 | * 2/1998 | Cooper | 340/572 |
| 5,745,036 | * 4/1998 | Clare | 340/572 |
| 5,825,290 | * 10/1998 | Lian et al. | 340/572 |

* cited by examiner

Primary Examiner—Benjamin C. Lee
(74) Attorney, Agent, or Firm—Rabin & Champagne, P.C.

(57) ABSTRACT

An RF identification system, including an identification tag having a unique RF signature, a source for generating RF energy, and a detector for reading the signature when the identification tag is illuminated the RF energy generated by the source. The identification tag includes a base formed from an electrically non-conductive material and metal particles distributed randomly in the base. Detected signatures may be stored for later comparison against detected signatures for identification purposes. Biometric data may be read and associated with corresponding signatures to identify and link objects with persons.

33 Claims, 2 Drawing Sheets

RF IDENTIFICATION PROCESS AND APPARATUS

This application claims priority to provisional application Serial No. 60/035,477 filed Jan. 13, 1997.

FIELD OF THE INVENTION

The present invention is directed to the a process and apparatus for tracking objects. In particular, the present invention is directed to a system for tracking people for security purposes, and for monitoring the movement of a person's belongings or other objects for security reasons.

BACKGROUND OF THE INVENTION

There are a number of situations in which surveillance of a person or group of persons is necessary. An obvious example is use in law enforcement applications where the movements of an undercover agent must be monitored, or when low-risk criminals are sentenced to periods of home detention. There are also many applications for the monitoring of objects. For example, illicit drugs used by law enforcement officials in sting operations must be tracked to provide a chain of possession.

Another example is the tracking of baggage and passengers within the zone of responsibility of a given airport. More specifically, a system is needed for identifying a passenger early in the airport check in procedure, processing that passenger and his or her baggage, including carry-on items, and reconciling the person and items (baggage/packages) as they move through the airport up to the point of departure, and then again as they arrive at the destination. This system could be applied to any means of public transportation, including in train stations and bus stations. In the context of airport security, such a system could accomplish the total accountability desired by the airport, the airlines, and the federal entities that regulate both. The example of airport security will be used herein to facilitate disclosure of the present invention. The present invention is not limited to this specific application, however, and is contemplated for use with any application in which persons or objects are tracked for any purpose.

SUMMARY OF THE INVENTION

According to a first aspect of the invention, an RF identification system includes an identification tag having a unique RF signature, a source for generating RF energy, and a detector for reading the signature when the identification tag is illuminated by the RF energy generated by the source. The identification tag may include a base formed from an electrically non-conductive material. The identification tag may include metal particles distributed in the base. The metal particles may be metal-coated glass rods. The metal particles are distributed randomly in the base. The source for generating RF energy preferably generates energy at a frequency of at least about 25 gigahertz. The source for generating RF energy preferably generates energy in a field. The RF identification system may include storage means coupled to the detector for storing the signature read by the detector. The RF identification system may also include comparing means, coupled to the storage means, for comparing a signature read by the detector with a signature stored in the storage means. The RF identification system may also include a biometric reader for reading biometric data, preferably for storage in the storage means, which may also include means for associating the biometric data with the signature.

According to another aspect of the invention, a process for providing identification includes generating RF energy, placing an identification tag within a region illuminated by the RF energy, and reading the signature. The identification tag provides a unique signature when illuminated by RF energy. Generating RF energy may include generating a field of RF energy, and placing an identification tag within a region illuminated by the RF energy includes placing the identification tag within the field, storing the signature, and comparing a read signature with a stored signature. The process may also include reading biometric data, storing the read biometric data, and associating the stored signature with the stored biometric data. The identification tag preferably includes a base formed from an electrically non-conductive material. The identification tag preferably includes metal particles distributed in the base. Preferably, the metal particles are metal-coated glass rods that are distributed randomly in the base.

DETAILED DESCRIPTION OF THE INVENTION

Figure 1:
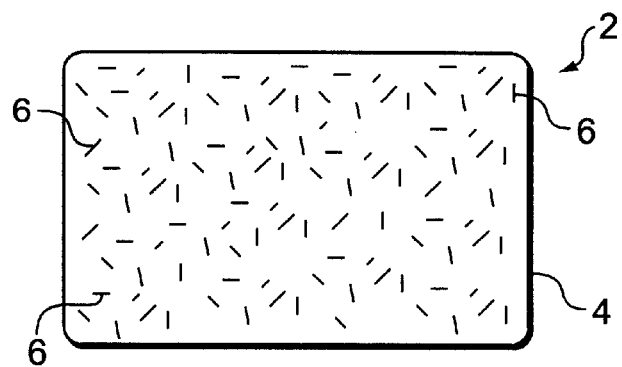
FIG. 1 shows an exemplary RFID tag of the invention.
Figure 3:
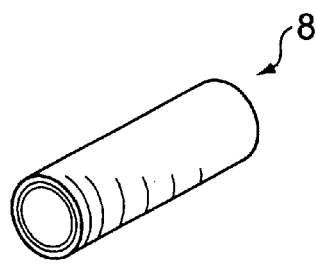
FIG. 3 shows a metal-coated rod.

The present invention utilizes a radio frequency identification (RFID) process based on an RFID tag to accomplish the tracking function. As shown in FIG. 1, the tag 2 has a base 4 which may take the form of a plastic card, much like a credit card or identification badge, a heavy paper card, such as an airline ticket or baggage tag, or any other electrically non-conductive material. Small metal particles 6 are distributed, preferably embedded, in the base 4. These small particles 6 are preferably metal-coated glass rods 8, asho as shown in FIG. 3, cut to a size suitable for use as bipolar antennas matched to a predetermined frequency. The particles 6 are distributed on the base 4 in a random fashion. The physical dimensions of the finished RFID tag 2, combined with the unique random distribution of the metal particles 6, makes each RFID tag 2 completely distinguishable from any other RFID tag 2. The tag 2 can then be put into a field of RF energy, which will react with the randomly-distributed antennas in the tag to establish a characterization of the tag. Because of the random distribution of the antennas 6 on the tag 2, and the resulting unique nature of each individual tag, each tag 2 will exhibit a unique signature when energized. Thus, each time the tag 2 is illuminated by energy of a particular frequency, the signature of its associated reflected energy can be read to uniquely identify the tag 2. Such tags can be affixed to baggage, passenger tickets, and employee badges in order to track these entities within the airport.

Figure 2:
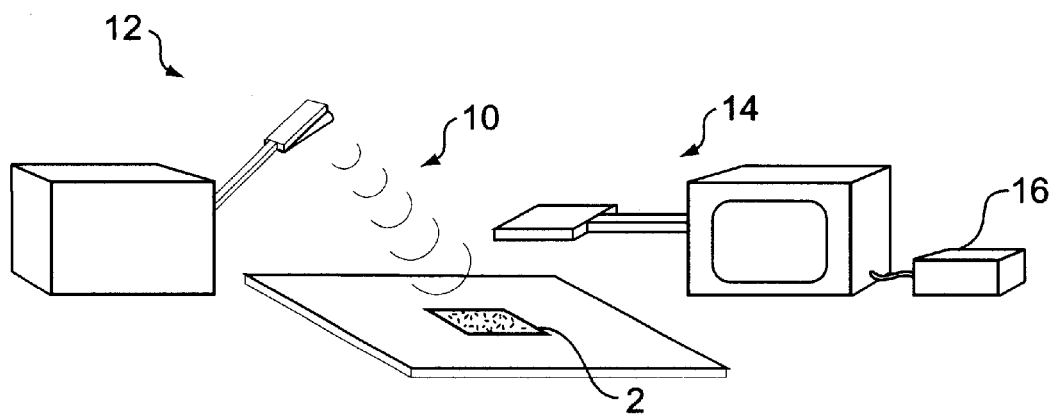
FIG. 2 shows an exemplary RFID apparatus of the invention.
Figure 4:
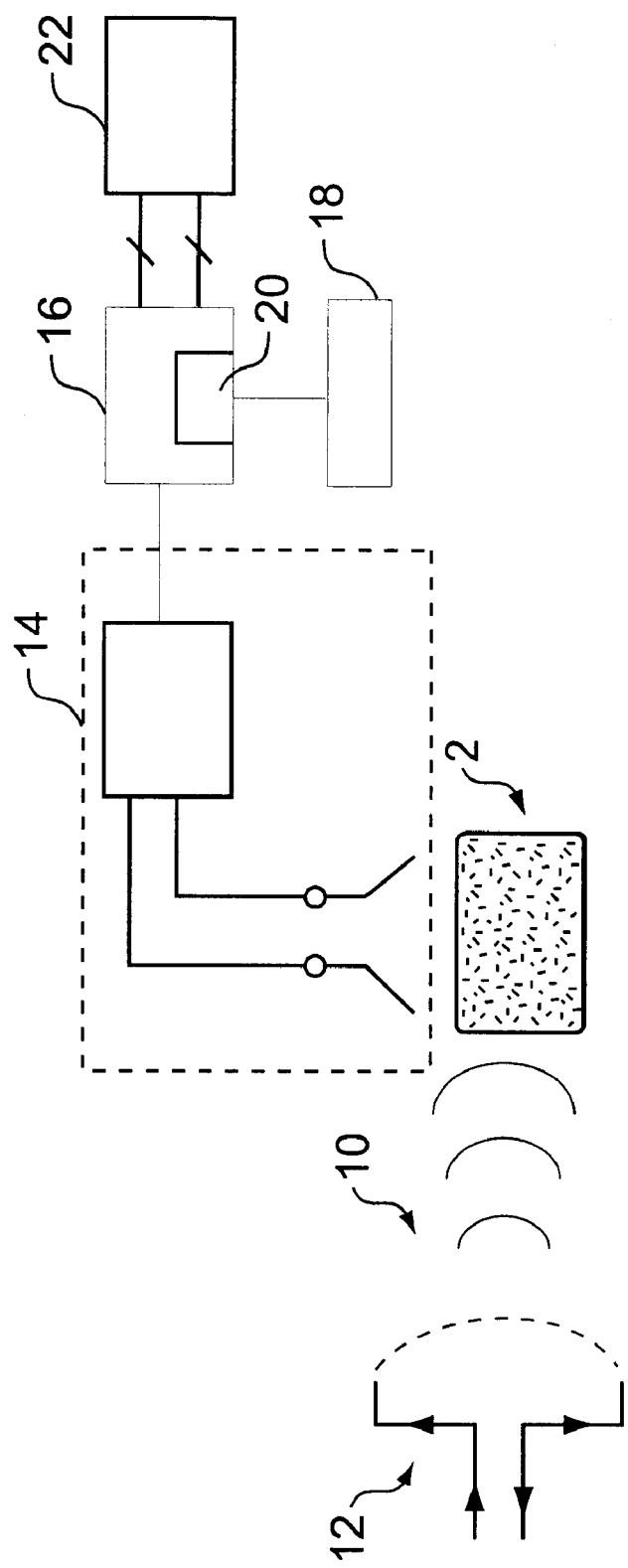
FIG. 4 shows a block diagram of an exemplary RFID apparatus of the invention.

The frequency for tag illumination may be chosen to suit the environment of the particular operation. For example, in an airport, where there is a significant amount of communications equipment already in operation, a frequency of 25 Ghz or higher would be preferable. At such a frequency, little or no interference with existing equipment is likely. Further, the nature of high frequency waveguide construction is such that the aperture of the horn device acts as its own cutoff for frequencies that are 18 Ghz or lower. As shown in FIG. 2 and in block diagram form in FIG. 4, a field 10 may therefore be generated by an RF generator or other source of RF energy 12, flooding a predetermined area with the selected frequency. When each tag 2 is fabricated, a percentage of energy generated and directed toward the tag 2 is reflected by the particles in the tag to generate the unique signature for the tag. This signature is recorded by a detector 14 as a reference identification, which is stored in memory 16 coupled to the detector 14 and indexed as a known pattern and value. Later, when the tag 2 is in use and is moved about the area of concern (for example, an airport), fields 10 of RF illumination may be generated to produce a known constant reflected cone of energy. When a particular tag moves into the established cone of energy, the tag is illuminated and may be identified by its unique signature. Because the tag 2 is physically stable and because the reflected energy is at a constant frequency, the signal reflection is also consistent. At frequencies in the Ghz range, the identification process is not hampered by any material in the line of sight. The high frequency, "flooding signal" is used as a gate to track the passage of a particular tag, and the resulting signature can be "seen" through clothing and through flesh. For example, a tag 2 formed on an airline ticket in a shirt pocket is readable from a distance of approximately 10 meters. Thus, according to the system of the invention, RF energy is used to uniquely identify a passive tag.

The tag 2 is given an index number associated with a travel ticket, which is also indexed to a sales or transaction number, for a corresponding passenger. The tracking of the digital information in this manner is in itself a significant improvement over the bar code and hand written tagging process for baggage handling that is in practice today. To make the individual identification portion of the accountability loop more reliable, an analog function (preferably biometric) would positively identify the individual associated with the ticket and the baggage. The analog identification process will preferably be unobtrusive, and covert.

That is, passengers entering a federally-controlled enclave such as an airport are necessarily subject to scrutiny for a wide range of security reasons. Overt technologies making use of palm prints, fingerprints, and the unnerving retinal eye scan, do not cover the need for interception and surveillance that are required by law enforcement and security personnel. Facial thermograms, however, provide reliable identification information without the requirement of an obtrusive data collection process. Each person has a vascular pattern in the facial area that is unique. Even twins have distinguishable facial vascular patterns. Vascular flow is primarily dependent on diet, metabolism, and a variety of other physical attributes particular to an individual. A facial thermogram process, coupled with the RFID process, provides a combination of identification and tracking capabilities that can easily be controlled within a specific physical environment such as an airport.

Thus, a passenger purchasing an airline ticket at a ticket counter, or checking in on arrival at an airport, will be issued an airline ticket that includes the antenna particles such that it also functions as an RFID tag 2. Alternatively, such a tag 2 may be affixed to the ticket in some manner. The passenger's facial vascular pattern may be thermally scanned by a biometric reader 18 at the counter, and the information derived from the scan can be linked by means 20 in the memory 16 to the reference signature associated with the tag. Any baggage checked or carried by the passenger will receive a tag that is also linked to the thermogram information. Sensors that illuminate the tags and detect the tag's signature can be placed at exits to the airport. Thus, if a passenger checks baggage on a flight, or leaves a carry-on bag in the airport, and then leaves the airport and does not board the plane for the flight that was booked, the luggage corresponding to that erstwhile passenger can be taken off the plane or removed from the airport as a potential security risk. The particular baggage can be easily found by searching for the unique signature of the tag associated with the baggage.

If the passenger is a legitimate traveler and actually completes the flight, the system of the present invention can also help prevent his or her baggage from being stolen. The linked tag signature(s) and thermograph information can be electronically provided to the destination airport. In the baggage claim area, this can be used to ensure that the person leaving with the baggage is the same person who checked in the baggage by comparing the stored reference signature with the signature read from the tag 2 by use of a comparator 22 coupled to the memory 16, thereby providing personal security for the passenger.

As stated previously, the present invention has myriad other applications to situations where the tracking of people and/or objects is useful. In all such applications, the linking of a person's identifying physical information with a reliable means of identifying and tracking an associated object adds a level of reconciliation that greatly improves the state of surveillance techniques.

What is claimed is:

1. An RF identification system, comprising:
an identification tag having a unique RF signature;
a source for generating RF energy; and
a detector for reading the unique RF signature when the identification tag is illuminated by the RF energy generated by the source.

2. The RF identification system of claim 1, wherein the identification tag includes a base formed from an electrically non-conductive material.

3. The RF identification system of claim 2, wherein the identification tag includes a plurality of separate metal particles distributed in the base.

4. The RF identification system of claim 3, wherein the metal particles are metal-coated glass rods.

5. The RF identification system of claim 3, wherein the metal particles are distributed randomly in the base.

6. The RF identification system of claim 3, wherein the metal particles are randomly sized.

7. The RF identification system of claim 1, wherein the source for generating RF energy generates energy at a frequency of at least about 25 gigahertz.

8. The RF identification system of claim 1, wherein the source for generating RF energy generates energy in a field.

9. The RF identification system of claim 1, further including storage means coupled to the detector for storing the signature read by the detector.

10. The RF identification system of claim 9, further including comparing means, coupled to the storage means, for comparing a signature read by the detector with a signature stored in the storage means.

11. The RF identification system of claim 9, further including a biometric reader for reading biometric data.

12. The RF identification system of claim 9, further including a biometric reader for reading biometric data for storage in the storage means.

13. The RF identification system of claim 12, wherein the storage means includes means for associating the biometric data with the signature.

14. The RF identification system of claim 9, further including indexing means, coupled to the storage means, for associating a read index value with the signature read by the detector.

15. The RF identification system of claim 14, further including comparing means, coupled to the storage means, for comparing the read index value with a stored index value that is stored in the storage means.

16. The RF identification system of claim 1, wherein the unique RF signature is an RF energy signature reflected by the identification tag when the identification tag is illuminated by the RF energy generated by the source.

17. The RF identification system of claim 1, wherein
the identification tag is a first identification tag having a first unique RF signature, and a second identification tag having a second unique RF signature; and
the detector distinguishes between the first unique RF signature and the second unique RF signature.

18. A process for providing identification, comprising:
generating RF energy;
placing an identification tag within a region illuminated by the RF energy, wherein the identification tag provides a unique RF signature when illuminated by RF energy; and
reading the unique RF signature.

19. The process of claim 18, wherein generating RF energy includes generating a field of RF energy, and placing an identification tag within a region illuminated by the RF energy includes placing the identification tag within the field.

20. The process of claim 18, further including storing the signature.

21. The process of claim 20, further including comparing a read signature with a stored signature.

22. The process of claim 20, further including reading biometric data.

23. The process of claim 22, further including storing the read biometric data.

24. The process of claim 23, further including associating the stored signature with the stored biometric data.

25. The process of claim 20, further including associating a read index value with the read signature.

26. The process of claim 25, further including comparing the read index value with a stored index value.

27. The process of claim 18, wherein the identification tag includes a base formed from an electrically non-conductive material.

28. The process of claim 27, wherein the identification tag includes a plurality of separate metal particles distributed in the base.

29. The process of claim 28, wherein the metal particles are metal-coated glass rods.

30. The process of claim 28, wherein the metal particles metal particles are distributed randomly in the base.

31. The process of claim 28, wherein the metal particles are randomly sized.

32. The process of claim 18, wherein the unique signature is an RF energy signature reflected by the identification tag when the identification tag is illuminated by the RF energy in the region.

33. The process of claim 18, wherein the identification tag is a first identification tag and the unique RF signature is a first unique RF signature, further comprising
placing a second identification tag within a region illuminated by the RF energy, wherein the second identification tag provides a second unique RF signature when illuminated by RF energy;
reading the second unique RF signature; and
distinguishing between the first unique RF signature and the second unique RF signature.

* * * * *